United States Patent
LeBeau et al.

(10) Patent No.: US 8,402,533 B2
(45) Date of Patent: Mar. 19, 2013

(54) INPUT TO LOCKED COMPUTING DEVICE

(75) Inventors: Michael J LeBeau, Palo Alto, CA (US);
John Nicholas Jitkoff, Palo Alto, CA (US); Romain P Guy, San Francisco, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 12/851,739

(22) Filed: Aug. 6, 2010

(65) Prior Publication Data

US 2012/0036556 A1    Feb. 9, 2012

(51) Int. Cl.
*G06F 21/00* (2006.01)
(52) U.S. Cl. .................... 726/17; 726/4; 726/21
(58) Field of Classification Search ............. 726/17–20, 726/4, 21
See application file for complete search history.

(56) References Cited

U.S. PATENT DOCUMENTS

| | | | |
|---|---|---|---|
| 5,870,083 A | 2/1999 | Shieh | |
| 6,216,230 B1 | 4/2001 | Rallis et al. | |
| 6,401,205 B1 | 6/2002 | Rallis et al. | |
| 2004/0204123 A1 | 10/2004 | Cowsky, III et al. | |
| 2005/0212760 A1 | 9/2005 | Marvit et al. | |
| 2005/0253817 A1 | 11/2005 | Rytivaara et al. | |
| 2007/0150842 A1 | 6/2007 | Chaudhri et al. | |
| 2008/0191905 A1 | 8/2008 | Martin et al. | |
| 2008/0310602 A1 | 12/2008 | Bhupati | |
| 2009/0164467 A1 | 6/2009 | Ala-Lahti | |
| 2009/0264159 A1* | 10/2009 | Hsieh et al. | 455/566 |
| 2009/0289916 A1* | 11/2009 | Dai | 345/173 |
| 2010/0146437 A1* | 6/2010 | Woodcock et al. | 715/806 |
| 2010/0159995 A1* | 6/2010 | Stallings et al. | 455/566 |
| 2012/0023573 A1* | 1/2012 | Shi | 726/17 |

OTHER PUBLICATIONS

Authorized Officer B. Copenheaver. International Search Report and Written Opinion in international application No. PCT/US2011/045928, dated Dec. 9, 2011, 14 pages.
Grundel et al., "A Direct Manipulation User Interface for the Control of Communication Processes—Making Call Handling Manageable," *Proceedings of the HCI International '99 (the 8th International Conference on Human-Computer Interaction) on Human-Computer Interaction: Communication, Cooperation, and Application* Design, vol. 2, 1999, p. 8-13.

* cited by examiner

*Primary Examiner* — Philip Chea
*Assistant Examiner* — Ghazal Shehni
(74) *Attorney, Agent, or Firm* — Fish & Richardson P.C.

(57) ABSTRACT

The subject matter of this specification can be embodied in, among other things, a method that includes receiving at a computing device that is in a locked state, one or more user inputs to unlock the device and to execute at least one command that is different from a command for unlocking the device. The method further includes executing in response to the user inputs to unlock the device an unlocking operation by the device to convert the device from a locked state to an unlocked state. The method further includes executing the at least one command in response to receiving the user inputs to execute the at least one command. The at least one command executes so that results of executing the at least one command are first displayed on the device to a user automatically after the device changes from the locked state to the unlocked state.

28 Claims, 7 Drawing Sheets

INPUT TO LOCKED COMPUTING DEVICE

BACKGROUND

Computing devices, such as smartphones or desktop computers, often have a security measure that prevents accidental and/or unauthorized access. The locking of a device may simply be aimed at preventing casual contact with the device from leading to a dialed number or similar input, or it may be aimed at preventing a user other than the owner of the device from accessing the full functionality of the device (partial functionality like a clock and access to dialing 911 may be permitted even when the device is locked). For example, a user of a smartphone may enter a number of alphanumeric characters to gain access to the full functionality of the smartphone, or a smartphone may have a touchscreen on which a simple pattern can be drawn by a user to unlock the device. A more complex pattern can be used to prevent access by unauthorized users. Larger computers, such as desktop computers, also often require a person to enter a username and password to unlock or gain access to the device.

SUMMARY

In general, this document describes systems and techniques by which a locked computing device may respond to inputs from a user of the device who is preferably an authorized user of the device. In particular examples discussed below, the input is a request to perform a particular operation beyond simply unlocking the device. For example, icons for a number of commands may be displayed on a touchscreen, though a user will not be able to invoke those commands when the device is locked simply by tapping them in a normal manner, as the user could if the device were unlocked. Instead, the user may be required to perform a more complex action that is unlikely to be performed accidentally or by an unintended action such as contact with the touchscreen when the device is in a user's pocket. Such action may involve, for example, dragging from one of the command-related icons to an unlock icon at a different location on the touchscreen and releasing over that other icon. The device may then respond by executing at least part of the requested command while the unlocking operation is still being performed, such as launching an application to which the first icon is directed. In this two-icon dragging example, the motion may also be reversed, with the user starting at an unlock icon and dragging to a command-related icon.

In one aspect, a computer-implemented method for making an input to a locked device includes receiving at a computing device that is in a locked state, one or more user inputs to unlock the computing device and to execute at least one command that is different from a command for unlocking the computing device. The method further includes executing in response to the user inputs to unlock the computing device an unlocking operation by the computing device to convert the computing device from a locked state to an unlocked state. The method further includes executing the at least one command in response to receiving the user inputs to execute the at least one command. The method further includes wherein the at least one command executes so that results of executing the at least one command are first displayed on the computing device to a user automatically after the computing device changes from the locked state to the unlocked state.

Implementations can include any, all, or none of the following features. Executing the at least one command begins before the user inputs to unlock the computing device are fully received. The method includes comparing the user inputs to unlock the computing device to one or more passcodes, and executing the unlock operation only if the user inputs to unlock the computing device match the one or more passcodes. Receiving the user inputs to unlock the computing device and to execute the at least one command, includes receiving a touch input on a device touchscreen to unlock the computing device and a spoken input to execute the at least one command. Receiving the user inputs to unlock the computing device and to execute the at least one command, includes receiving a dragging motion between an icon that corresponds to a function corresponding to the at least one command, and an icon that corresponds to an unlocking function for the computing device. Executing the at least one command includes making a network request to a server system that is remote from the computing device so as to accelerate availability of content from the server system as soon as the computing device is unlocked. The method includes storing results from the server system without displaying the results while the computing device is locked, and displaying the stored results when the computing device is unlocked.

In one aspect, a computer program product, encoded on a computer-readable medium, operable to cause one or more processors to perform operations for making an input to a locked device including receiving at a computing device that is in a locked state, one or more user inputs to unlock the computing device and to execute at least one command that is different from a command for unlocking the computing device. The operations further include executing in response to the user inputs to unlock the computing device an unlocking operation by the computing device to convert the computing device from a locked state to an unlocked state. The operations further include executing the at least one command in response to receiving the user inputs to execute the at least one command. The operations further include wherein the at least one command executes so that results of executing the at least one command are first displayed on the computing device to a user automatically after the computing device changes from the locked state to the unlocked state.

In one aspect, a computer-implemented system for making an input to a locked device includes a computing device that includes a user interface that receives, while the computing device is in a locked state, one or more user inputs to unlock the computing device and to execute at least one command that is different from a command for unlocking the computing device; a processor that executes, in response to the user inputs to unlock the computing device, an unlocking operation to convert the computing device from a locked state to an unlocked state and executes the at least one command in response to receiving the user inputs to execute the at least one command; and a display device that first displays results of executing the at least one command on the computing device to a user automatically after the computing device changes from the locked state to the unlocked state.

Implementations can include any, all, or none of the following features. The computer device further includes a microphone that receives audio, and executing the at least one command includes processing the received audio. The system includes a server system, and processing the received audio includes sending the received audio to the server system and receiving the results from the server system. The computing device further includes a memory that stores the results received from the server system without displaying the results while the computing device is locked, and displaying the stored results when the computing device is unlocked.

The systems and techniques described here may provide one or more of the following advantages. First, a user of a computer-implemented system can access resources on the system in less time and with less effort than they would if they had to unlock the device and then select an action to perform with the device. Second, a system can perform in parallel an unlocking operation and a user-requested operation, such as launching an application or making the application the focus of the system. Third, a system can receive a voice input that requests an operation while an unlocking operation is performed. Fourth, results of an operation that was requested while a computing device is locked can be presented audibly while the computing device is being unlocked.

The details of one or more implementations are set forth in the accompanying drawings and the description below. Other features and advantages will be apparent from the description and drawings, and from the claims.

DETAILED DESCRIPTION

This document describes systems and techniques for inputting a command while unlocking a mobile device. The command, which is distinct from a command to unlock the device, can be executed while the mobile device is being unlocked. For example, a user can command a dialer to call a particular contact, such as the user's wife, with a single input action. In another example, a user can command an email client to request new emails from a mail server while a mobile telephone is being unlocked. In some implementations, this can provide greater efficiency than a command entered after unlocking by allowing a mobile device to at least begin performing an action that is complex, lengthy, or delayed by network communication while a user makes an input to unlock the telephone. In some implementations, a system can provide efficient input commands by accepting a single input that initiates multiple actions, such as an unlocking operation and another operation or an email operation and an email recipient selection.

Figure 1:
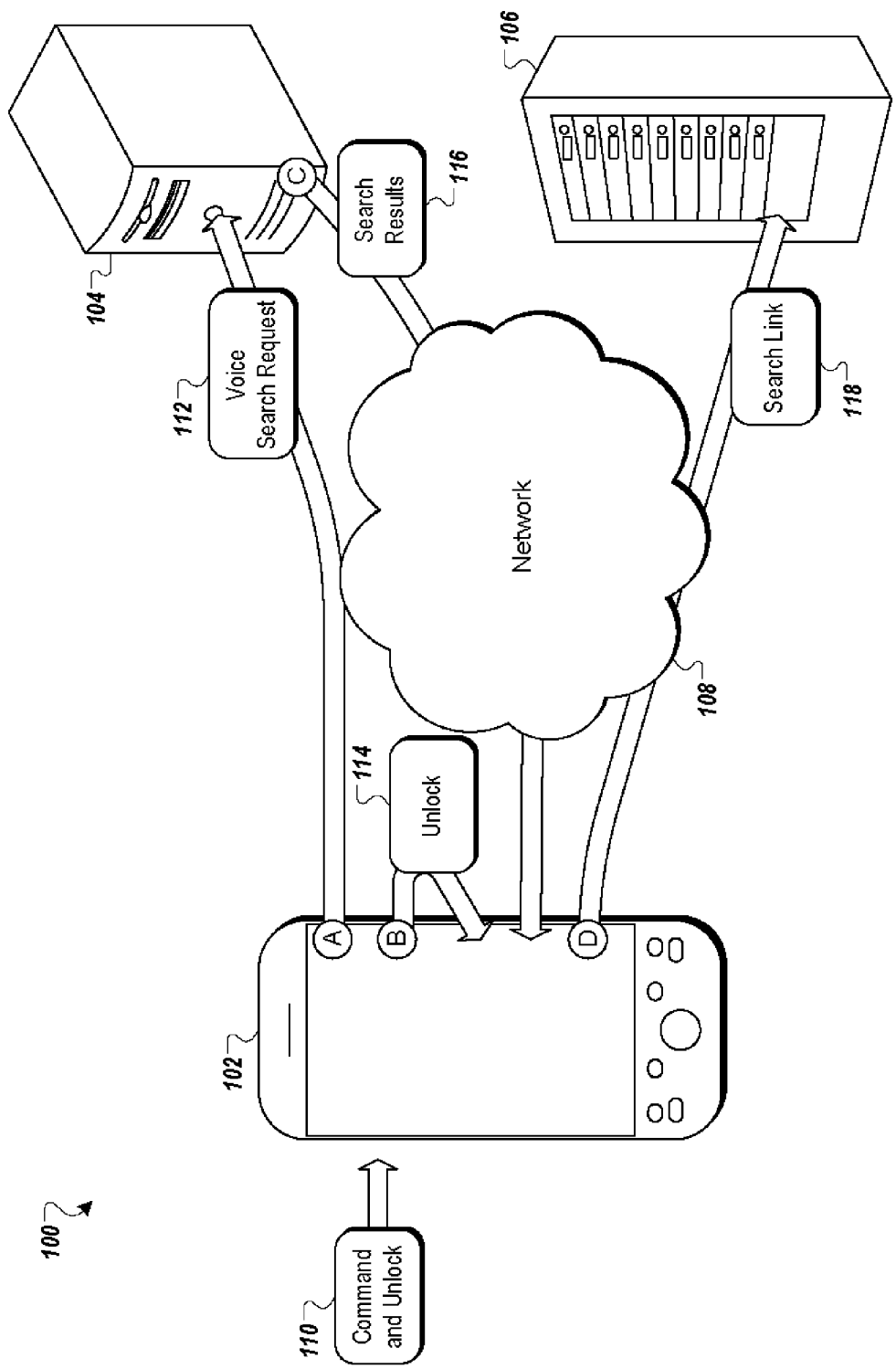
FIG. 1 is a schematic diagram that shows an example of a system for initiating an action while unlocking a device.

FIG. 1 is a schematic diagram that shows an example of a system 100 for initiating an action at a mobile device 102 while unlocking the mobile device 102. The mobile device 102 is an electronic device that performs one or more actions, such as a smartphone or a tablet computer. The mobile device 102 includes a user interface that can be locked and unlocked by a user, and typically will implement the interface as a touchscreen display in a familiar manner. For example, a cellular telephone or other computing device can be locked to prevent accidental or unauthorized access. Such locking may be instigated manually by a user (such as by the user placing the device into a sleep state by pressing a power button) or automatically such as by a predetermined period of inactivity for the device passing. During an unlocking operation performed by the user, a portion of the user input triggers an action that is performed concurrently with the unlocking operation. For example, the mobile device 102 can send a search query to a search server 104.

The search server 104 is a computer system that accepts search queries and in return provides search results. In some implementations, the search queries can be provided in text, audio, or other data formats. For example, a search query "buffalo wings" sent to the search server 104 can return a list of links to content servers, including a content server 106. The content servers include content related to buffalo wings recipes, local restaurants that serve buffalo wings, buffalo anatomy, media labeled "buffalo wings", and small airports in the Nantucket area that serve buffalo wings. The results for certain queries that are determined to be location-based in character, such as queries that refer to foods served in restaurants, may be "local" results, such as links to web sites for restaurants and telephone numbers for the restaurants near that serve buffalo wings near the user's current location (as determined, for example, using GPS information from the device or cell tower triangulation, among other techniques).

The content server 106 is a computer system that serves content, such as web pages, video, audio, or other media over a computer network 108 to client devices, such as the mobile device 102. For example, the content server 106 can serve web page from the search results that lists reviews of a restaurant that serves buffalo wings.

The computer network 108 is a network that provides for communication between the mobile device 102, the search server 104, and the content server 106. The computer network 108 can include, for example, the Internet, a local intranet, cellular data networks such as the Enhanced Data rates for Global System for Mobile Evolution (EDGE) and/or other wired or wireless data networks.

The components of the system 100 may interact with each other in response to commands and other inputs provided by a user of the mobile device 102, and such actions are shown using numbered arrows superimposed over the components in the figure. In this example, the mobile device 102 initially receives an input 110 from the user while the mobile device 102 is in a locked state. The input 110 includes a request to unlock the mobile device 102 and a request to perform an action that is different from unlocking the device. For example, the request to perform an action can include a voice command to perform a search using one or more search terms in the voice the command. In another example, the request to perform the action can include a selection or moving of an icon or area that represents the action. The request to unlock the mobile device 102 can include, for example, a text-based or pattern-based (e.g., finger-traced) password or passcode.

The mobile device 102 then receives the two-part input 110 from the user. From the input 110, the mobile device 102 detects the request to perform the action and, in this example, subsequently the request to unlock the mobile device 102. Where the request to unlock is expected to take a relatively long time, such as when it involves entering a password or passcode as opposed to simply sliding an unlock mechanism (i.e., when the telephone is locked so as to avoid accidental input rather than to provide security) the selection of the other action may occur first, so that the device may begin performing the other action while the user performs the relatively time consuming action of entering the password or passcode. When the unlocking action can be performed quickly, it may more readily be implemented so that it is performed first by the user—in such a situation, the process does not really save time by starting the other action early, but it does save input effort for the user, because the user can, for instance, provide a single movement that combines unlocking and selection of an action.

In response to detecting the request to perform the action as an initial user input, the mobile device 102 begins performing the action prior to detecting the request to unlock the mobile device 102. For example, the mobile device 102 can detect a voice command to search for "buffalo wings" and can send a voice search request 112 to the search server 104. The voice search request 112 can include an audio file recording of the voice command, a text transcription of the voice command, and/or other corresponding content.

After or while the mobile device 102 is sending the voice search request 112 to the search server 104, it can detect from the user's input 110, a request to unlock 114 the mobile device 102. In response, the mobile device 102 determines if the request to unlock 114 the mobile device 102 includes a valid request, such as a correct password or unlock pattern. If the request to unlock 114 the mobile device 102 is valid, then the mobile device 102 unlocks itself. Otherwise, the mobile device 102 remains in the locked state and can prompt the user to reenter the unlocking information. As long as the user has not entered an appropriate credential (password or passcode), the device 102 maintains a typical locked state in which it accepts only very limited inputs, such as dialing of emergency numbers, and provides only limited, non-secure information such as the date and time. This is true even though the mobile device 102 may be performing activities relating to the initial user action or request, but is not making the results of the actions visible to or otherwise accessible to the user of the mobile device 102.

In response to receiving the search request, the search server 104 sends one or more search results 116 back to the mobile device 102. The search results 116 can include, for example, a list of links that include titles and associated uniform resource identifiers (URIs). The search results 116 can arrive at the mobile device 102 before, during, or after unlocking of the device 102 is complete. In the case in which the search results 116 arrive before the end of unlocking, the search results 116 can be temporarily stored by the mobile device 102 without displaying them. If the mobile device 102 is not successfully unlocked within a certain amount of time, the search results 116 can be discarded. After the mobile device 102 is successfully unlocked, the mobile device 102 displays the search results 116. The user can then select one of the search results 116, and the mobile device 102 can send a request to the content server 106 or another server (e.g., a content server for a company that is a subject of the selected result and/or an advertising server in order to register the user's selection of an advertising result so that the advertiser may be billed for a user click) using the URI associated with the title.

Thus, by the system and process shown here, a computing device can begin processing a command for a user while the user is still in the process of unlocking the device, so that the results for the command can be presenting immediately, or at least more quickly than would otherwise be possible, to the user. Also, the user may combine an input for unlocking a device with an input of a command so that the user can save effort in performing the two distinct operations via one common and continuous input (i.e., the user need not pause to wait for a response from the device, such as when a user must first make an input to unlock a device, wait for the full unlocked display of the device to be shown, and then execute a command such as by selecting an icon on the display).

Figure 2:
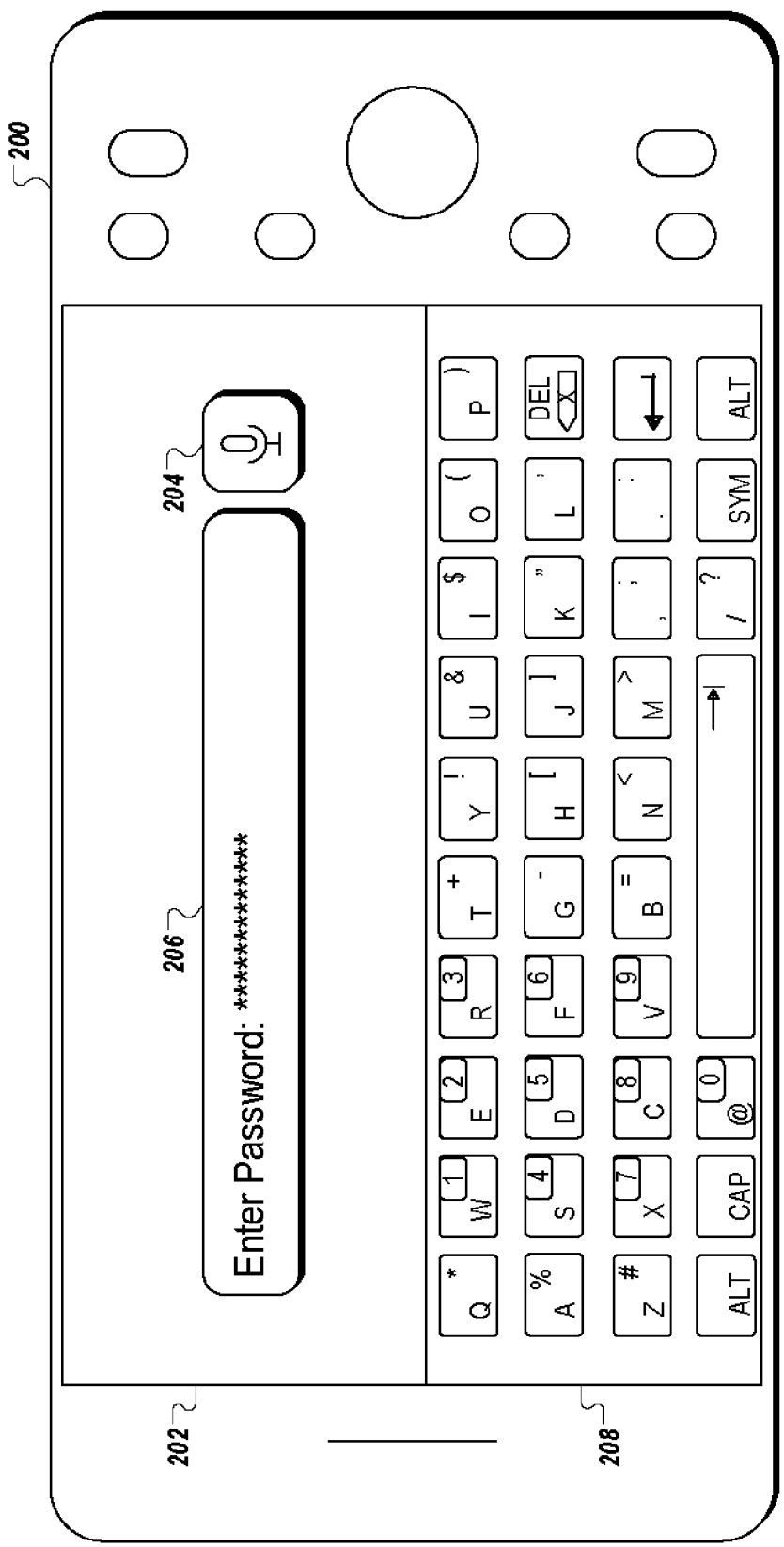
FIG. 2 shows an example of a user interface for initiating an action while unlocking a device.

FIG. 2 shows an example of a mobile computing device 200 that allows a user to initiate an action while unlocking the mobile computing device 200. In general, the device contains memory and processors for executing code from the memory so that a user can substantially simultaneously perform an action (such as an action instigated by a touch or voice input) and unlock the device 200. In this example, the device is shown in the middle of being unlocked by a user, and may be performing background activities that have been previously started by an input from the user.

The mobile computing device 200 includes a screen 202 that presents to the user various user interface elements, such as a search icon 204 and a password field 206. The mobile computing device also includes a keyboard 208. The keyboard 208 can include hard keys or virtual, soft keys (e.g., a touchscreen keyboard within the screen 202). The user can select the search icon 204 to begin speaking a search command to the mobile computing device 200. While speaking the search command or while waiting for a response to the search command, the user can make an input in the password field 206 using the keyboard 208. The processing of the password input and the search query can occur concurrently. If the password input is successful, the mobile computing device 200 can subsequently present the search results to the user in the screen 202, after the device has changed from its prior locked mode or status to an unlocked mode or status.

The screen 202 is a touchscreen, such as a capacitive or resistive screen for user input and output. The search icon 204 is a graphical user interface (GUI) object and the device 102 can detect when a user presses over the top of the icon, so that the element acts as a software button. The password field 206 is also a GUI object. The password field 206 displays asterisks (*) for each character that is entered into the password field 206 using the keyboard 208.

For example, before a user completes a password entry input, the user can press the search icon 204, speak a voice command to the mobile computing device 200, and subsequently complete the password entry input using the keyboard 208. In another example, the user can input the password or other unlocking information in another way, such as by speaking the password or drawing an unlocking pattern on the screen 202. When the user correctly enters the password or other unlocking information, the mobile computing device 200 can present results of the voice command. In some implementations, some results can be presented to the user before their device completes the unlocking operation. For example, a summary of search results can be displayed. In some implementations, the summary of the search results cannot be selected or acted on by the user until the device has successfully completed the unlocking operation.

In different contexts, different amounts of information may be shown to the user or different levels of input may be allowed from the user, before the device has completed its unlocking. Generally, information and actions that are associated with security for the device (i.e., that would allow an interloper to send a message masquerading as the real user, that would let an interloper run up a bill for the real user, or that would let an interloper see personal information of the user such as contact records or other data files on the device) will be withheld from a user of the device until after the device is unlocked. Information that is shown before the device is unlocked is traditionally time information, perhaps local weather, and controls for unlocking and making emergency (e.g., 911) telephone calls. Limited additional functionality might also be permitted, such as the ability to use a web browser at limited URLs, the ability to review a news reader, and the like. In any such situations, however, the accessibility of an unlocked device is effectively unlimited, while the accessibility of a locked device is noticeably and extensively more limited.

As one example of input functionality that may be available (though with limited output) for a locked device using the techniques described here, which would not generally be available on a locked computing device, a user can press the search icon 204, speak the voice command "search raspberry jam," and enter the password "12345" using the keyboard 208. In this example, the mobile computing device 200 can begin parsing and executing the voice command while the password is being entered with the keyboard 208. If the mobile computing device 200 finishes parsing and executing the voice command before the entire password is entered, the results of the execution can be stored and held without displaying them, and then be displayed upon successful unlocking of the device 200. If the mobile computing device 200 is successfully unlocked before it finishes parsing and executing the voice command, it can display a GUI object that indicates that the voice command is being processed. Alternatively, if the mobile computing device 200 is successfully unlocked after the it finishes parsing and executing the voice command, it can unlock normally and notify the user when the results of executing the voice command are ready to be displayed.

Figure 3B:
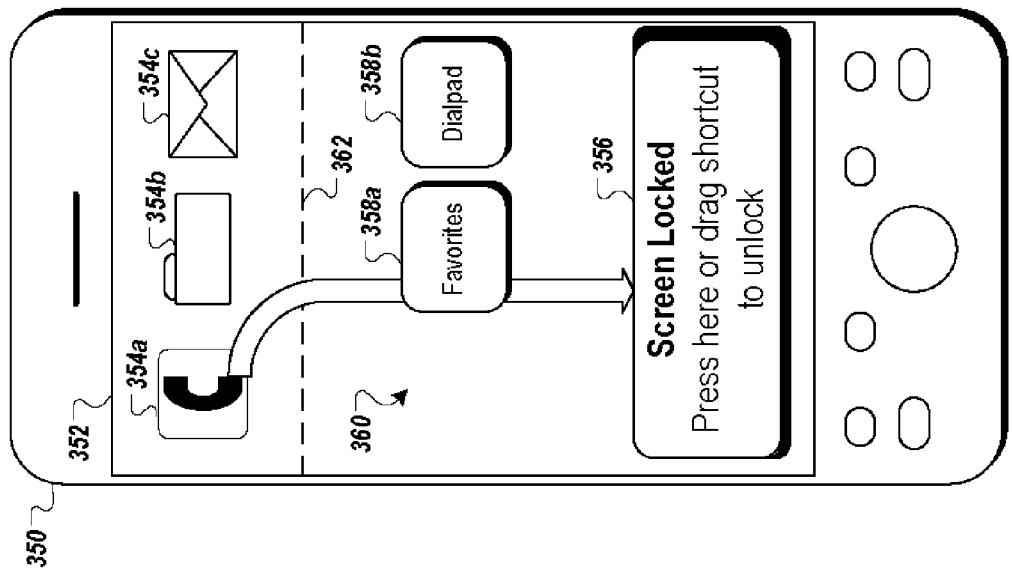
FIG. 3B shows an example of a graphical user interface and icons for initiating a modified action while unlocking a device.
Figure 3A:
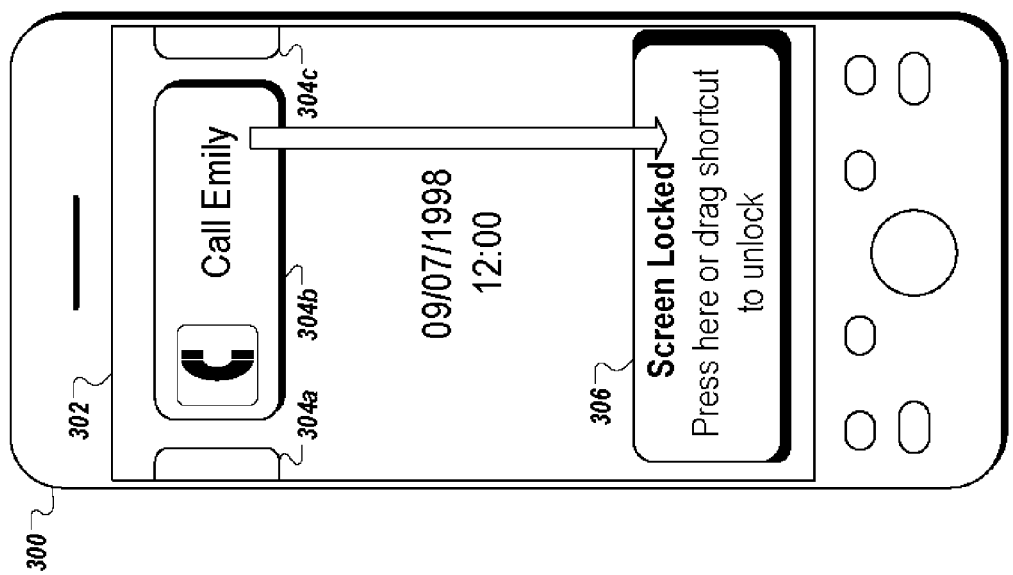
FIG. 3A shows an example of a graphical user interface and icons for initiating an action while unlocking a device.

FIG. 3A shows an example of a mobile computing device 300 that allows a user to initiate an action while unlocking the mobile computing device 300. In general, the device provides for convenience-based unlocking rather than the security-based unlocking just described. In particular, convenience-based unlocking is directed to requiring a user to perform an action on a touchscreen that would not easily be performed accidentally or by inanimate objects that might come in contact with the screen, such as when the mobile computing device 300 is in the user's pocket. In the example described in more detail below, such an action involves dragging from an icon that corresponds to a command, to an unlocking icon that is located far enough away from the first icon on a display that the dragging input would not frequently occur accidentally or coincidentally.

The mobile computing device 300 in this example includes a touchscreen 302 for displaying outputs to, and receiving inputs from, the user. While the mobile computing device 300 is in a locked state, the touchscreen 302 displays one or more action icons 304*a-c* and an unlock icon 306.

The action icons 304*a-c* represent shortcuts for requesting that a particular action be performed. The action icons 304*a-c* include a the action icon 304*b* that represents an action for placing a telephone call to a contact named Emily. The user can make an input on the touchscreen 302 that drags the action icon 304*b* to the unlock icon 306. The mobile computing device 300 can then in response initiate a telephone call to the contact named Emily as soon as the mobile computing device 300 unlocks, and automatically without further input from the user.

In one example, the mobile computing device 300 can begin initiating the action when the action icon 304*b* has been pulled a threshold distance toward the unlock icon 306, such as to a particular line or location on the touchscreen before reaching the unlock icon 306 or otherwise completing the unlocking operation. In some implementations, preparation for an action can begin before the unlocking operation is completed by the device. For example, an antenna for wireless communication can be activated or a data connection can be established (or such action can at least begin) without performing a final step for the requested action (e.g., completing the telephone call to the selected contact). Once the mobile computing device 300 receives a successful unlock command, then the mobile computing device 300 can perform the final step for the requested action.

In some implementations, the mobile computing device 300 can display an authentication screen in response to a user dragging the action icon 304*b* to the unlock icon 306. For example, the mobile computing device 300 can present a password entry field. In some implementations, the unlocking information can include a more complex pattern than selecting or dragging an icon to the unlock icon 306. For example, after the user selects or drags the action icon 304*b* as described above, the unlocking pattern may involve selecting and/or dragging a pattern across a series of multiple unlock icons.

The mobile computing device 300 can also allow the user to scroll through the action icons 304*a-c*. For example, the user can make a sideways dragging or flicking motion to scroll left to the action icon 304*a* or right to the action icon 304*c*. In some implementations, more than one action icon can be displayed in the touchscreen 302 at the same time. For example, the next contact name alphabetically in the mobile computing device 300 may be a contact named Elizabeth. Accordingly, the action icon 304*c* can be a command to initiate a telephone call to the contact named Elizabeth. Flicking the action icon 304*c* to the left can scroll the action icon 304*c* to the center of the screen of the mobile computing device 300, into the location in which the action icon 304*b* is currently shown. Subsequently, the user can drag the action icon 304*c* to the unlock icon 306 to initiate a call to the contact named Elizabeth.

FIG. 3B is an example of a mobile computing device 350 that allows a user to initiate an action while unlocking the mobile computing device 350. The device 350 is similar to the device 300 in FIG. 3A, but in this example, two different actions may be specified before the user chooses to unlock the device (i.e., by dragging through two icons).

The mobile computing device 350 includes a touchscreen 352 for displaying outputs to and receiving inputs from the user. While the mobile computing device 350 is in a locked state, the touchscreen 352 displays one or more action icons 354*a-c*, an unlock icon 356, and one or more value icons 358*a-b*.

The action icons 354*a-c* relate to a particular category or application. For example, the action icon 354*a* relates to placing telephone calls, the action icon 354*b* relates to accessing documents or files, and the action icon 354*c* relates to accessing email. The mobile computing device 350 can present other action icons as well, such as an action icon for a web browser or social network. The value icons 358*a-b* relate to values, events, settings, or other data that can modify or be acted on by one or more of the action icons 354*a-c*.

As a user drags an action icon toward the unlock icon 356, the action icon can be dragged through one of the value icons 358*a-b*, which can modify the category or application associated with the action icon. For example, the action icon 354*a* for placing a telephone call can be dragged through the value icon 358*a* for favorites and then dragged into the unlock icon 356. In this example, the mobile computing device 350 will prepare a list of favorite contacts to be displayed for calling as soon as, and automatically as, the mobile computing device 350 unlocks. In another example, the action icon 354*a* can be dragged through the value icon 358*b* for a dial-pad and dragged into the unlock icon 356. In such an example, the mobile computing device 350 prepares a dial-pad application for outgoing telephone calls as the mobile computing device 350 unlocks. In some implementations, an empty space 360 is left to allow an action icon to reach the unlock icon 356 without being dragged through any of the value icons 358*a-b*.

In some implementations, the value icons 358*a-b* can be displayed above the action icons 354*a-c*. In such a case, the value icons 358*a-b* can be dragged through an action icon and to the unlock icon 356 to perform an action while the mobile computing device 350 unlocks. For example, a value icon related to a contact named Emily can be dragged through the action icons 354*a-c*. In particular, the value icon for the contact named Emily can be dragged through an action icon that relates to tasks or applications, such as an instant messaging application, a social network site or application, or the telephone application. In such an example, dragging the value icon related to the contact named Emily through the action icon 354*a* and to the unlock icon 356 causes the mobile computing device 350 to initiate a telephone call to Emily while the mobile computing device 350 unlocks.

In another implementation, the value icons 358*a-b* contain values for a particular one of the action icons 354*a-c* that the user selects. For example, if the action icon 354*a* for placing a telephone call is selected and/or dragged, then the value icons 358*a-b* can relate to contacts that can be called using the telephone application, such as the value icon 358*a* for favorite contacts or individual contacts (e.g., Emily and Elizabeth). Dragging the action icon 354*a* through a value icon that relates to a contact named Emily can cause the mobile computing device 350 to initiate a telephone call to Emily while the device unlocks.

In some implementations, the value icons 358*a-b* change depending on the action icon that the user selects. For example, when the user drags one of the action icons 354*a-c* out of the top of the touchscreen 352, then one or more of the value icons 358*a-b* can change based on the selected action icon. In some implementations, a user can trigger or initiate the change in the value icons 358*a-b* by dragging an action item across a line 362. The line 362 can be either shown to or hidden from the user. Some of the value icons 358*a-b* can be general to multiple ones of the action icons 354*a-c*. For example, the value icon 358*a* for favorites can modify any of the action icons 354*a-c*. The value icon 358*a* indicates a most often accessed or bookmarked data. In another example, the value icon 358*b* for the dial-pad can modify only the action icon 354*a* for the telephone application, because it may not be appropriate for other ones of the action icons 354*b-c*, such as recent files, email, and others.

In another example, the mobile computing device 350 can receive a selection of the action icon 354*c* for the email application. In response to crossing the line 362, the mobile computing device 350 can update the value icons 358*a-b* to include a list of tasks that can be performed by the email application, such as a value icon for reading email or composing an email. In another example, the mobile computing device 350 can update the value icons 358*a-b* to include icons representing unread or new emails. While the unlocking operation is performed, the mobile computing device 350 can refresh the email inbox of the user and/or retrieve a specific email for presentation to the user in the touchscreen 352. In some implementations, the mobile computing device 350 can present a third set of icons. For example, the user can select and/or drag the action icon 354*c* for the email application, a value icon for composing an email, and then one or more of a third set of contact icons to select recipients for the email.

In some implementations, features described with respect to FIG. 3 allow for efficient use of limited display real estate. For example, scrolling action icons can allow easy access to many actions while providing each action with a large icon that can easily be controlled on a touchscreen. Separate screens for command input and authentication can allow larger GUI objects and locations used for user input. Combining action icons and modifying values can provide more options than the number of GUI objects shown.

Figure 4:
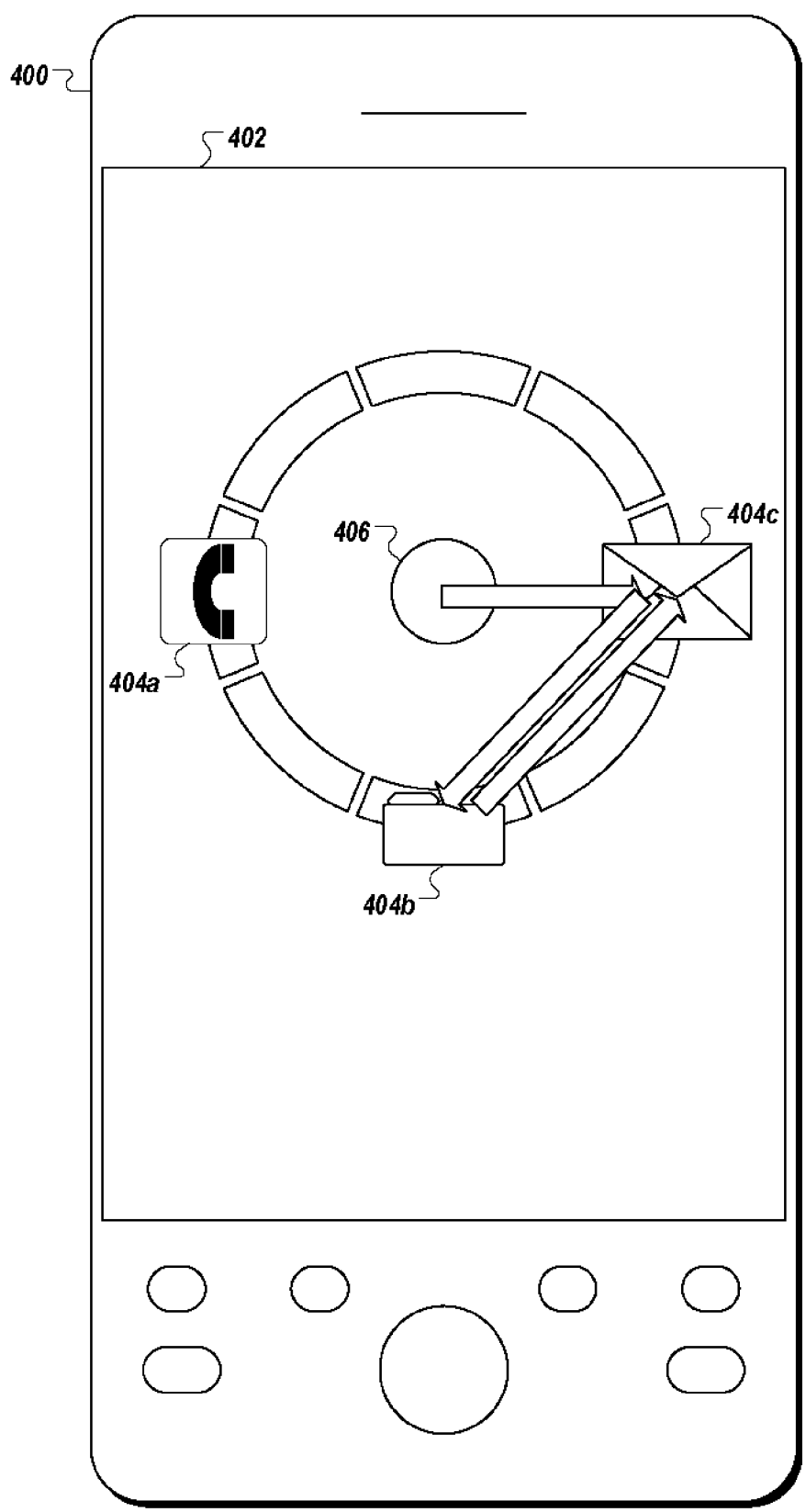
FIG. 4 shows an example of a graphical user interface and a radial menu for initiating an action while unlocking a device.

FIG. 4 shows an example of a mobile computing device 400 that allows a user to initiate an action while unlocking the mobile computing device 400. In this example, the inputs that a user provides to the device 400 when unlocking the device 400 are providing by using a radial menu interface element.

The mobile computing device 400 includes a touchscreen 402 for displaying outputs to, and receiving inputs from, the user. While the mobile computing device 400 is in a locked state, the touchscreen 402 displays one or more action icons 404*a-c* and an unlock icon 406. The touchscreen 402 can be, for example, a capacitive or resistive screen for user input and output. The mobile computing device 400 detects a user selection and/or dragging of the unlock icon 406 that requests initiation of an action and an unlocking of the mobile computing device 400.

In particular, the mobile computing device 400 receives an input from the user that drags the unlock icon 406 to the action icon 404*c*, then to the action icon 404*b*, and finally back to the action icon 404*c*. In this example, the first selection of the action icon 404*c* indicates a request from the user to open the email application upon completion of the unlocking operation. Subsequently, the user drags an unlock pattern through the action icons 404*b-c* (i.e., drag one action clockwise to the action icon 404*b* and then one action counter-clockwise back to the action icon 404*c*). After the first selection of the action icon 404*c* for the email application, the mobile computing device 400 begins initiating the email application, such as by refreshing the inbox, retrieving content for messages, and/or retrieving contact information. Once the mobile computing device 400 receives the remainder of the user input including a successful unlocking pattern, then the mobile computing device 400 presents the user interface for the requested email application.

Similarly, the user can drag the unlock icon 406 to the action icon 404*b*, then to the action icon 404*a*, and finally back to the action icon 404*b*. Upon the first selection of the action icon 404*b*, the mobile computing device 400 begins preparing the documents application. After receiving the successful unlocking pattern, the mobile computing device 400 presents the user interface for the documents application to the user in the touchscreen 402. In some implementations, some features of the GUI can enlarge, shrink, move, disappear, appear, or otherwise alter their appearance and/or location, for example, to facilitate input and/or provide feedback to the user regarding icons recognized as selected by the mobile computing device 400. The tracing through multiple action icons and an unlock icon can also result in actions corresponding to each and every one of the action icons being carried out generally concurrently with the device being unlocked. For example, a user could cause multiple applications to be launched automatically as the device is unlocked.

In another example, the user can hold the mobile computing device 400 to the user's ear or mouth, speak a voice command, and subsequently unlock the mobile computing device 400 by inputting the unlock pattern. The mobile computing device 400 detects raising of the mobile computing device 400 to the user's ear (or proximity of a large object—a head—in front of the device's screen) and, in response, enables speech input using a microphone in the mobile computing device 400. Alternatively, the mobile computing device 400 can enable speech input in response to selection of an action icon on the touchscreen 402. The mobile computing device 400 begins processing the voice command while the user inputs the unlocking information (which can be provided by touch or verbally). For example, the mobile computing device 400 can retrieve search results in response to a search command or refresh an email inbox in response to an email command.

In another implementation, a user can select the action icon to be executed separately from the input for the unlocking information. For example, the user can double tap or long press a particular action icon to be executed and then separately select and/or drag an unlocking pattern or password using on screen controls. Again, the mobile computing device 400 begins preparing the selected operation upon the initial selection of the action icon. Subsequently, the mobile computing device 400 receives the unlocking information and, in response, presents the user interface for the selected operation.

Figure 5:
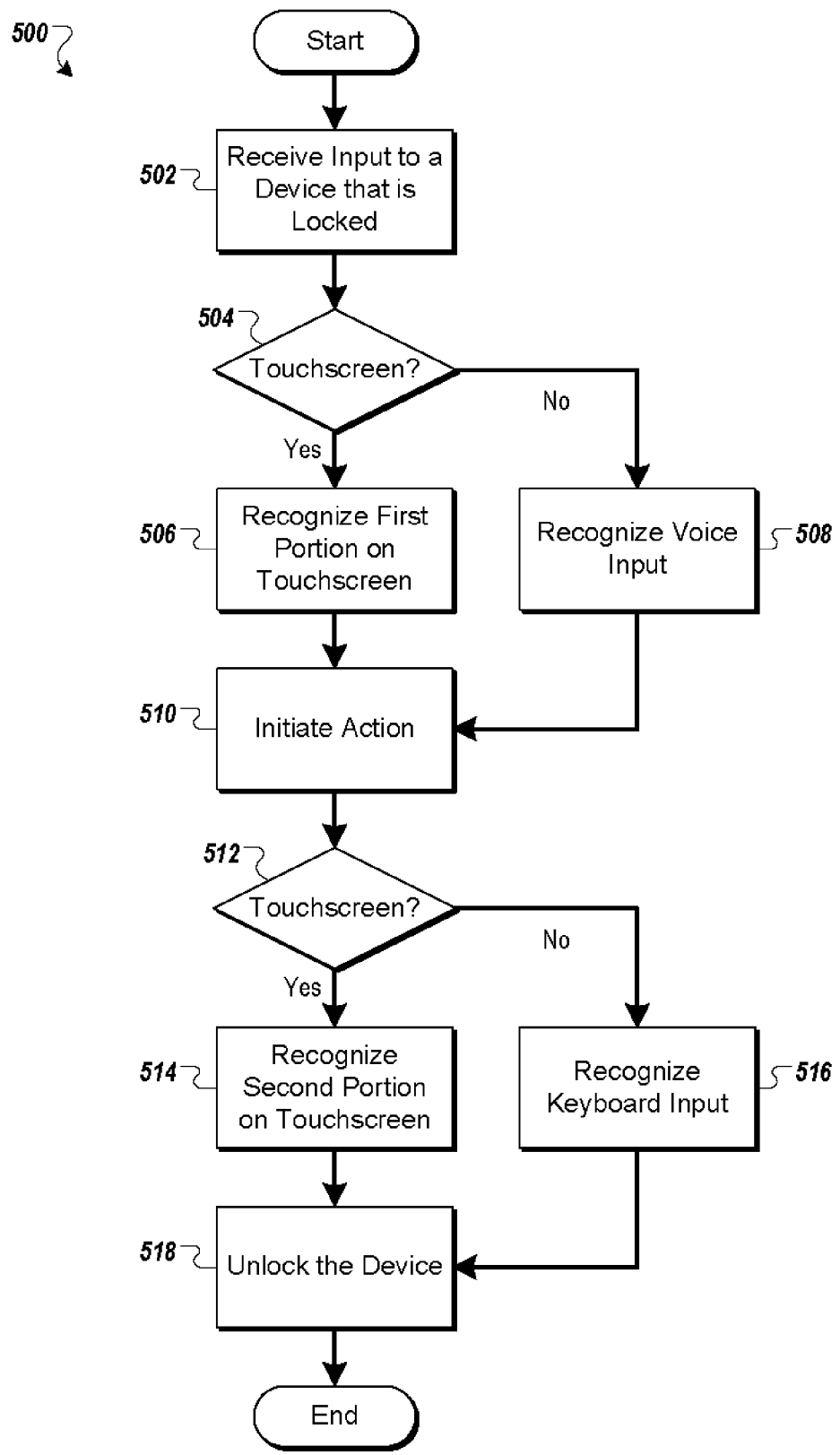
FIG. 5 is a flow chart that shows an example of a process for initiating an action while unlocking a device.

FIG. 5 is a flow chart that shows an example of a process 500 for initiating an action while unlocking a device. In general, the process involves recognizing a user's input on a touchscreen of an unlocking input and a second input that is separate from the unlocking input, both before the device is switched from a locked to an unlocked mode, and performing actions that correspond to the second input and automatically presenting the result of the performed actions when the device becomes unlocked.

The process 500 may be performed, for example, by a system such as the system 100 and the mobile computing devices 200, 300, 350, and 400. For clarity of presentation, the description that follows uses the system 100 and the mobile computing devices 200, 300, 350, and 400 examples for describing the process 500. However, other systems, or combination of systems, may be used to perform the process 500.

The process 500 includes receiving (502) an input from a user to a device that is locked. For example, the mobile device 102 can be one of mobile telephones, personal data assistants, music players, and other such devices that include input features which can be locked when the device is not in use.

The process 500 then determines (504) if the input includes a touchscreen input. For example, the mobile device 102 can include a touchscreen for selecting icons or keys. Alternatively, the mobile device 102 can include a microphone for inputting voice commands.

If the input includes a touchscreen input, then the process 500 includes recognizing (506) a first portion of the input on the touchscreen. For example, the mobile device 102 can include an icon, graphic, location, or button that can be pressed, dragged, or otherwise activated. In one example, a user can place a finger over an icon on a screen of the mobile device 102 and drag their finger across the screen indicating a direction of travel for the icon. In another example, a blank area of the touchscreen of the mobile device 102 can be similarly dragged to an icon on the touchscreen.

If the input includes a voice input, then the process 500 includes recognizing (508) the voice input. For example, the mobile device 102 can include a microphone that receives audio commands from the user. The microphone can be activated in response to, for example, an accelerometer reading or an explicit request from the user, such as by selecting a microphone icon. The voice input can be recognized, or translated to text and otherwise processed, either at the device itself or by sending a sound file to a server system and receiving corresponding text of the spoken words and other meta data.

When the portion of the input has been received, the process 500 initiates (510) an action based on the first portion or the voice input. For example, the first portion of the touchscreen input and/or the voice input may indicate an application, script, program, or other action to be performed by the mobile device 102. The mobile device 102 begins performing the requested action prior to receiving unlocking information.

The process 500 determines (512) if a touchscreen input is present. For example, the mobile device 102 can include a touchscreen for inputting an unlock pattern. If no touchscreen is present or not being used for the unlocking information, the a keyboard input or anther type of input can be retrieved.

If the touchscreen is being used, then the process 500 recognizes (514) a second portion of the input on the touchscreen. For example, the icon or location of the previous steps can be dragged to a location or icon before the user removes a finger from the touchscreen of the mobile device 102, such as in the case of an unlock pattern.

If the touchscreen is not being used, then the process 500 recognizes (516) a keyboard or other input. For example, a user can select individual keys on a keyboard.

If the second portion of the input and/or the keyboard input include proper unlock information, then the process 500 includes unlocking (518) the device. For example, the mobile device 102 can be unlocked after recognizing (516) the unlock pattern or the keyboard input. Upon unlocking, the mobile device 102 presents results of the selected action to the user, such as in a user interface of an application for the selected action.

Figure 6:
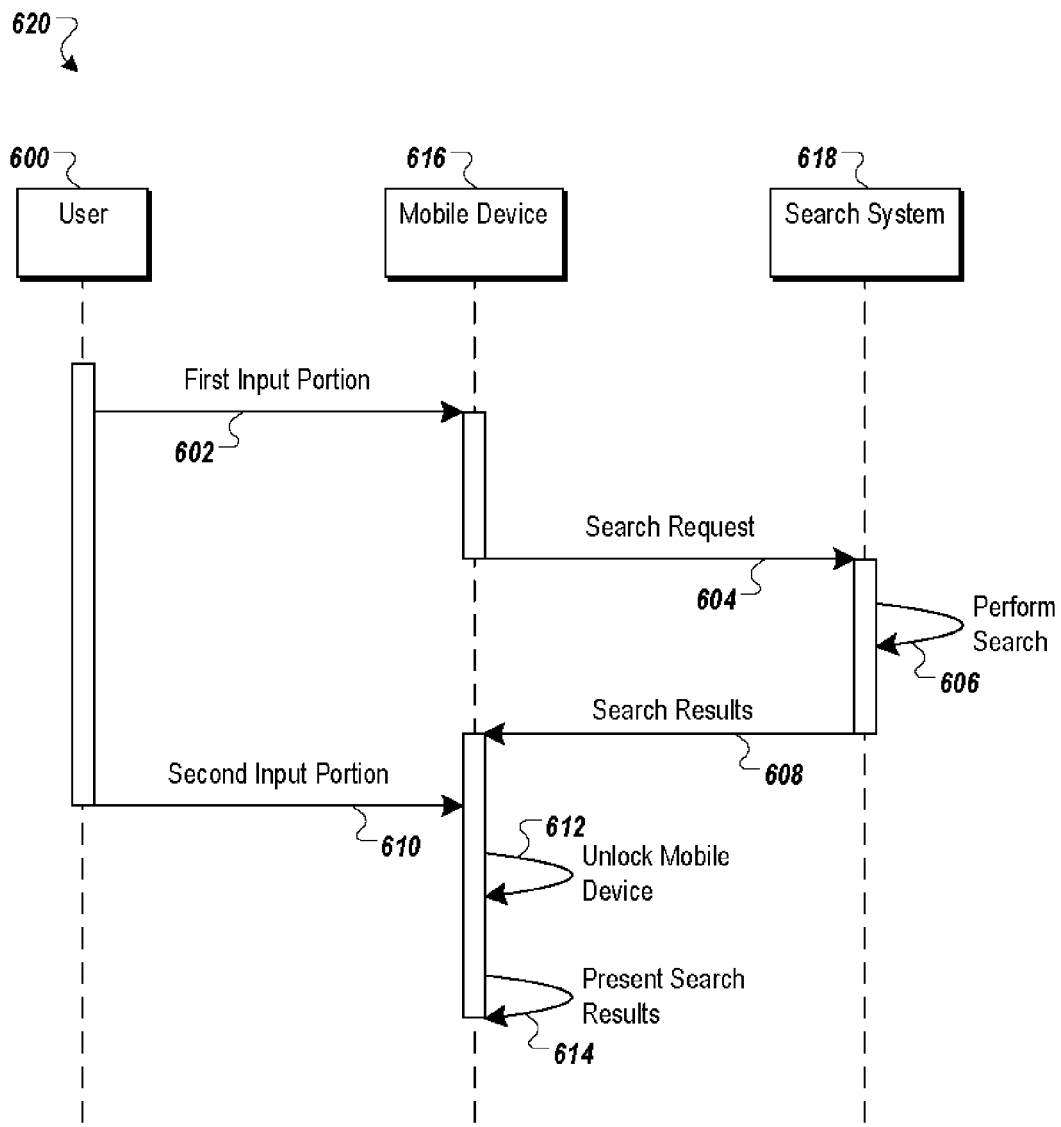
FIG. 6 is a sequence diagram that shows an example of a process for initiating an action while unlocking a device.

FIG. 6 is a sequence diagram that shows an example of a process 620 for initiating an action while unlocking a mobile device 616. A user 600 operates the mobile device 616 or a client software application in communication with the mobile device 616, or other system able to send messages to the mobile device 616. The mobile device 616 is an electronic device that performs one or more actions and that is lockable to prevent accidental or unauthorized input. For example, a cellular telephone locks to prevent accidental input when the cellular telephone is in a pocket. A computer locks to prevent accidental or unauthorized input.

Once unlocked, the mobile device 616 can perform actions in response to user input commands. For example, the mobile device 616 can send search queries to a search system 618. The search system 618 is a computer system that accepts search queries and, in response, provides search results. For example, the search system 618 can be a search engine, database, or other system. The search system 618 can be included in the mobile device 616 or separate from the mobile device 616, such as a remote web server.

The mobile device 616 receives (602) a first input portion from the user 600. For example, the user can drag an icon or area of a touchscreen, enter input through a keyboard and/or speak a voice command into a microphone. The mobile device 616 processes the first input portion. For example, the mobile device 616 can identify the first input portion as including a search query. The mobile device 616 sends (604) a search request to the search system 618. In some implementations, the search request can include data from the first input portion and/or the mobile device 616. The search system 618 performs (606) a search based on the search request. For example, the search system 618 can compare terms in the search request to terms in a search index to identify one or more search results. The search system 618 sends (608) the search results to the mobile device 616.

The mobile device 616 receives (610) a second input portion from the user 600. For example, the second input portion can complete a password or pattern for unlocking the mobile device 616. The mobile device 616 unlocks (612) in response to the second input portion. After successfully unlocking, the mobile device 616 presents (614) the search results.

In one example, a user can speak a voice command "Pumpkinseed Street" as the first input portion. The mobile device 616 can parse the voice command and detect that the voice command is likely related to a location search. The mobile device 616 can transmit the voice command, in audio, text, or other format, along with global positioning system (GPS) information about the mobile device 616 to the search system 618 as the search request. The search system 618 can perform a search such as compiling a map of Pumpkinseed Street, collecting weather information ("sunny all day"), and/or traffic conditions ("all routes OK"). The map, weather information, and/or traffic conditions can be returned to the mobile device 616. The user 600 can enter an unlocking command, such as drawing a pattern on the touchscreen of the mobile device 616. The mobile device 616 unlocks itself in response to receiving a successful unlocking pattern. Once unlocked, the mobile device 616 displays the map of Pumpkinseed street, the "sunny all day" weather condition, and/or "all routes OK" traffic information.

In another example, the user 600 may enter a search request "Who was crowned king last Friday?" as the first input portion. The mobile device 616 sends the search request to the search system 618 without parsing, analyzing, or editing the first input portion. The search system 618 performs the action of searching for an answer to the query in the search request. In this example, no king was crowned last Friday, and the search system 618 spends a longer time performing the search than in some other examples. In this example, the user can input the second input portion before the search results are returned (not shown). In this example, the mobile device 616 can unlock the mobile device 616 and display a screen indicating that the mobile device 616 is waiting on search results (not shown).

Figure 7:
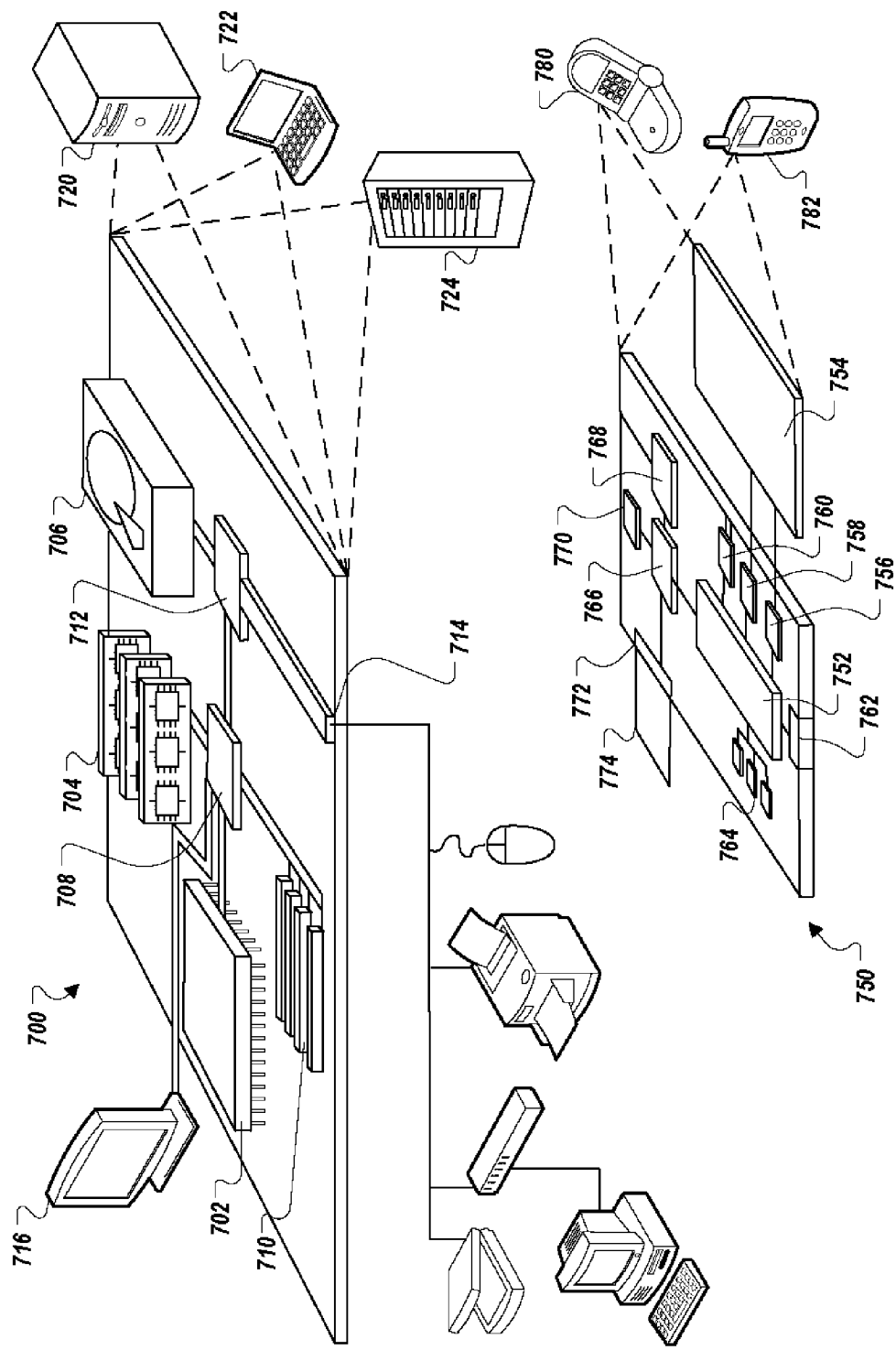
FIG. 7 shows an example of a computing device and a mobile computing device that can be used in connection with computer-implemented methods and systems described in this document.

FIG. 7 shows an example of a computing device 700 and a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a microdrive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the cellular telephone 780 and or smart-phone 782 can include a capacitive or resistive screen for user input and output.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
    receiving, at a computing device that is in a locked state, one or more first user inputs to unlock the computing device and to execute at least one first command that is different from a command for unlocking the computing device, wherein receiving the one or more first user inputs to unlock the computing device and to execute the at least one first command comprises receiving a dragging motion between a first icon that corresponds to a first function corresponding to the at least one first command, and an icon that corresponds to an unlocking function for the computing device;
    executing, in response to receiving the one or more first user inputs to unlock the computing device, an unlocking operation by the computing device to convert the computing device from the locked state to an unlocked state;
    executing the at least one first command in response to receiving the one or more first user inputs to execute the at least one first command, wherein the at least one first command executes so that results of executing the at least one first command are first displayed on the computing device automatically after the computing device converts from the locked state to the unlocked state;
    executing, by the computing device, a locking operation so as to convert the computing device from the unlocked state back into the locked state;
    receiving, at the computing device while the computing device is back in the locked state, one or more second user inputs to unlock the computing device and to execute at least one second command that is different from the command for unlocking the computing device, wherein receiving the one or more second user inputs to unlock the computing device and to execute the at least one second command comprises receiving a dragging motion between a second icon that corresponds to a second function corresponding to the at least one second command, and the icon that corresponds to the unlocking function for the computing device;
    executing, in response to receiving the one or more second user inputs to unlock the computing device, the unlocking operation by the computing device to convert the computing device from the locked state to the unlocked state; and
    executing the at least one second command in response to receiving the one or more second user inputs to execute the at least one second command, wherein the at least one second command executes so that results of executing the at least one second command are first displayed on the computing device automatically after the computing device converts from the locked state to the unlocked state.

2. The method of claim 1, wherein executing the at least one first command begins before the one or more first user inputs to unlock the computing device are fully received.

3. The method of claim 1, further comprising comparing the one or more first user inputs to unlock the computing device to one or more passcodes, and executing the unlock operation only if the one or more first user inputs to unlock the computing device match the one or more passcodes.

4. A computer program product, encoded on a non-transitory computer-readable medium, operable to cause one or more processors to perform operations, the operations comprising:
    receiving, at a computing device that is in a locked state, one or more first user inputs to unlock the computing device and to execute at least one first command that is different from a command for unlocking the computing device, wherein receiving the one or more first user inputs to unlock the computing device and to execute the at least one first command comprises receiving a dragging motion between a first icon that corresponds to a first function corresponding to the at least one first command, and an icon that corresponds to an unlocking function for the computing device;
    executing, in response to receiving the one or more first user inputs to unlock the computing device, an unlocking operation by the computing device to convert the computing device from the locked state to an unlocked state;
    executing the at least one first command in response to receiving the one or more first user inputs to execute the at least one first command, wherein the at least one first command executes so that results of executing the at least one first command are first displayed on the computing device automatically after the computing device converts from the locked state to the unlocked state;
    executing, by the computing device, a locking operation so as to convert the computing device from the unlocked state back into the locked state;
    receiving, at the computing device while the computing device is back in the locked state, one or more second user inputs to unlock the computing device and to execute at least one second command that is different from the command for unlocking the computing device, wherein receiving the one or more second user inputs to unlock the computing device and to execute the at least one second command comprises receiving a dragging motion between a second icon that corresponds to a second function corresponding to the at least one second command, and the icon that corresponds to the unlocking function for the computing device;

executing, in response to receiving the one or more second user inputs to unlock the computing device, the unlocking operation by the computing device to convert the computing device from the locked state to the unlocked state; and executing the at least one second command in response to receiving the one or more second user inputs to execute the at least one second command, wherein the at least one second command executes so that results of executing the at least one second command are first displayed on the computing device automatically after the computing device converts from the locked state to the unlocked state.

5. A computer-implemented system, comprising:

a computing device comprising:

a user interface that is configured to receiver, while the computing device is in a locked state:

(i) one or more first user inputs to unlock the computing device and to execute at least one first command that is different from a command for unlocking the computing device, wherein the one or more first user inputs to unlock the computing device and to execute the at least one first command comprises a dragging motion between a first icon that corresponds to a first function corresponding to the at least one first command, and an icon that corresponds to an unlocking function for the computing device, (ii) one or more second user inputs to unlock the computing device and to execute at least one second command that is different from the command for unlocking the computing device, wherein the one or more second user inputs to unlock the computing device and to execute the at least one second command comprises a dragging motion between a second icon that corresponds to a second function corresponding to the at least one second command, and the icon that corresponds to the unlocking function for the computing device;

a processor that is configured to execute:

(i) in response to the one or more first user inputs to unlock the computing device, an unlocking operation to convert the computing device from the locked state to an unlocked state, (ii) the at least one first command in response to receiving the one or more first user inputs to execute the at least one first command, (iii) in response to the one or more second user inputs to unlock the computing device, the unlocking operation to convert the computing device from the locked state to the unlocked state, and (iv) the at least one second command in response to receiving the one or more second user inputs to execute the at least one second command; and a display device to first display results of executing the at least one first command and the at least one second command on the computing device automatically after the computing device converts from the locked state to the unlocked state.

6. The system of claim 5, wherein the computing device further comprises a microphone that is adapted to receiver audio, and wherein executing the at least one first command includes processing the received audio.

7. The system of claim 6, further comprising a server system, and wherein processing the received audio includes sending the received audio to the server system and receiving the results from the server system.

8. The system of claim 7, wherein the computing device further comprises a memory that stores the results received from the server system without displaying the results while the computing device is locked, and wherein the computing device is configured to display the stored results when the computing device is unlocked.

9. A computer-implemented method, comprising:

presenting, by a computing device while the computing device is in a locked state, a display of (i) multiple icons that correspond to multiple respective actions able to be performed by the computing device, and (ii) an unlocking icon;

identifying, by the computing device while the computing device is in the locked state, a user contact with a touchscreen of the computing device and that has dragged from:

(a) a display of one of the multiple icons to the display of the unlocking icon, or (b) the display of the unlocking icon to the display of the one of the multiple icons;

executing, by the computing device and in response to identifying the user contact with the touchscreen, an unlocking operation so as to convert the computing device from the locked state to an unlocked state;

executing, by the computing device and in response to identifying the user contact with the touchscreen, the action that corresponds to the one of the multiple icons such that a result of the execution of the action is first presented by the computing device after the computing device has converted from the locked state to the unlocked state and is not presented by the computing device while the computing device is in the locked state;

executing, by the computing device, a locking operation so as to convert the computing device from the unlocked state and back into the locked state;

presenting, by the computing device while the computing device is back in the locked state, another display of (i) the multiple icons, and (ii) the unlocking icon;

identifying, by the computing device while the computing device is back in the locked state, a second user contact with the touchscreen and that has dragged from:

(c) a display of a second of the multiple icons to the display of the unlocking icon, or (d) the display of the unlocking icon to the display of the second of the multiple icons;

executing, by the computing device and in response to identifying the second user contact with the touchscreen, the unlocking operation so as to convert the computing device from the locked state to the unlocked state; and executing, by the computing device and in response to identifying the second user contact with the touchscreen, the action that corresponds to the second of the multiple icons such that a result of the execution of the action that corresponds to the second of the multiple icons is first presented by the computing device after the computing device has converted from the locked state to the unlocked state and is not presented by the computing device while the computing device is in the locked state.

10. The computer-implemented method of claim 9, wherein the action that corresponds to the one of the multiple icons is an action to display a telephone application program.

11. The computer-implemented method of claim 10, wherein the action that corresponds to the second of the multiple icons is an action to display an email application program.

12. The computer-implemented method of claim 9, further comprising identifying, by the computing device, that the user contact with the touchscreen released over the display of the unlocking icon or over the display of the one of the multiple icons.

13. The computer-implemented method of claim 9, further comprising displaying, by the computing device while the computing device is in the locked state and in response to identifying the user contact with the touchscreen of the computing device, an authentication screen with which a user of the computing device is able to supply a password, a passcode, or an unlock pattern;
wherein executing the unlocking operation is performed in response to identifying that the user supplied a correct password, correct passcode, or correct unlock pattern.

14. The computer-implemented method of claim 9, further comprising:
executing, by the computing device, another locking operation so as to convert the computing device from the unlocked state and back again into the locked state;
presenting, by the computing device while the computing device is back again in the locked state, another display of (i) the multiple icons, and (ii) the unlocking icon;
identifying, by the computing device while the computing device is back again in the locked state, a third user contact with the touchscreen of the computing device and that includes contact with the unlocking icon but does not include contact with any of the multiple icons; and
executing, by the computing device and in response to identifying the third user contact with the touchscreen, an unlocking operation that converts the computing device from the locked state to the unlocked state without execution of any of the actions that correspond to the multiple icons.

15. The computer-implemented method of claim 9, further comprising identifying, by the computing device, that the user contact with the touchscreen of the computing device included movement, during the dragging, over a display of one of multiple value icons, each of the multiple value icons being associated with a modification to the action that corresponds to the one of the multiple icons, the modification to the action being different for each of the multiple value icons; and
wherein executing the action that corresponds to the one of the multiple icons includes executing the modification that is to the action that corresponds to the one of the multiple icons and that is associated with the one of the multiple value icons.

16. The computer-implemented method of claim 15, wherein a plurality of the multiple icons are each associated with a different collection of value icons that are each associated with a modification to the action of the respective icon of the multiple icons.

17. The computer-implemented method of claim 9, wherein the user contact with the touchscreen of the computing device dragged from the display of the one of the multiple icons to the display of the unlocking icon.

18. The computer-implemented method of claim 9, wherein the user contact with the touchscreen of the computing device dragged from the display of the unlocking icon to the display of the one of the multiple icons.

19. A computer program product, encoded on a non-transitory computer-readable medium, operable to cause one or more processors to perform operations, the operations comprising:
presenting, by a computing device while the computing device is in a locked state, a display of (i) multiple icons that correspond to multiple respective actions able to be performed by the computing device, and (ii) an unlocking icon;
identifying, by the computing device while the computing device is in the locked state, a user contact with a touchscreen of the computing device and that has dragged from:
(a) a display of one of the multiple icons to the display of the unlocking icon, or
(b) the display of the unlocking icon to the display of the one of the multiple icons;
executing, by the computing device and in response to identifying the user contact with the touchscreen, an unlocking operation so as to convert the computing device from the locked state to an unlocked state;
executing, by the computing device and in response to identifying the user contact with the touchscreen, the action that corresponds to the one of the multiple icons such that a result of the execution of the action is first presented by the computing device after the computing device has converted from the locked state to the unlocked state and is not presented by the computing device while the computing device is in the locked state;
executing, by the computing device, a locking operation so as to convert the computing device from the unlocked state and back into the locked state;
presenting, by the computing device while the computing device is back in the locked state, another display of (i) the multiple icons, and (ii) the unlocking icon;
identifying, by the computing device while the computing device is back in the locked state, a second user contact with the touchscreen and that has dragged from:
(c) a display of a second of the multiple icons to the display of the unlocking icon, or
(d) the display of the unlocking icon to the display of the second of the multiple icons;
executing, by the computing device and in response to identifying the second user contact with the touchscreen, the unlocking operation so as to convert the computing device from the locked state to the unlocked state; and
executing, by the computing device and in response to identifying the second user contact with the touchscreen, the action that corresponds to the second of the multiple icons such that a result of the execution of the action that corresponds to the second of the multiple icons is first presented by the computing device after the computing device has converted from the locked state to the unlocked state and is not presented by the computing device while the computing device is in the locked state.

20. The computer program product of claim 19, wherein the action that corresponds to the one of the multiple icons is an action to display a telephone application program.

21. The computer program product of claim 20, wherein the action that corresponds to the second of the multiple icons is an action to display an email application program.

22. The computer program product of claim 19, wherein the operations further comprise identifying, by the computing device, that the user contact with the touchscreen released over the display of the unlocking icon or over the display of the one of the multiple icons.

23. The computer program product of claim 19, wherein the operations further comprise displaying, by the computing device while the computing device is in the locked state and in response to identifying the user contact with the touchscreen of the computing device, an authentication screen with which a user of the computing device is able to supply a password, a passcode, or an unlock pattern;
  wherein executing the unlocking operation is performed in response to identifying that the user supplied a correct password, correct passcode, or correct unlock pattern.

24. The computer program product of claim 19, wherein the operations further comprise:
  executing, by the computing device, another locking operation so as to convert the computing device from the unlocked state and back again into the locked state;
  presenting, by the computing device while the computing device is back again in the locked state, another display of (i) the multiple icons, and (ii) the unlocking icon;
  identifying, by the computing device while the computing device is back again in the locked state, a third user contact with the touchscreen of the computing device and that includes contact with the unlocking icon but does not include contact with any of the multiple icons; and
  executing, by the computing device and in response to identifying the third user contact with the touchscreen, an unlocking operation that converts the computing device from the locked state to the unlocked state without execution of any of the actions that correspond to the multiple icons.

25. The computer program product of claim 19, wherein the operations further comprise identifying, by the computing device, that the user contact with the touchscreen of the computing device included movement, during the dragging, over a display of one of multiple value icons, each of the multiple value icons being associated with a modification to the action that corresponds to the one of the multiple icons, the modification to the action being different for each of the multiple value icons; and
  wherein executing the action that corresponds to the one of the multiple icons includes executing the modification that is to the action that corresponds to the one of the multiple icons and that is associated with the one of the multiple value icons.

26. The computer program product of claim 19, wherein a plurality of the multiple icons are each associated with a different collection of value icons that are each associated with a modification to the action of the respective icon of the multiple icons.

27. The computer program product of claim 19, wherein the user contact with the touchscreen of the computing device dragged from the display of the one of the multiple icons to the display of the unlocking icon.

28. The computer program product of claim 19, wherein the user contact with the touchscreen of the computing device dragged from the display of the unlocking icon to the display of the one of the multiple icons.

* * * * *

UNITED STATES PATENT AND TRADEMARK OFFICE
CERTIFICATE OF CORRECTION

PATENT NO. : 8,402,533 B2
APPLICATION NO. : 12/851739
DATED : March 19, 2013
INVENTOR(S) : Michael J. LeBeau, John Nicholas Jitkoff and Romain P. Guy It is certified that error appears in the above-identified patent and that said Letters Patent is hereby corrected as shown below:

In the Claims:

Column 19, line 18, in Claim 5, delete "receiver," and insert -- receive, --, therefor.

Column 19, line 63, in Claim 6, delete "receiver" and insert -- receive --, therefor.

Signed and Sealed this
Twenty-eighth Day of May, 2013

Teresa Stanek Rea
*Acting Director of the United States Patent and Trademark Office*